United States Patent
Paterson et al.

(10) Patent No.: US 7,413,594 B2
(45) Date of Patent: Aug. 19, 2008

(54) ELECTRICAL POWER DISABLE IN AN AIR CLEANER

(75) Inventors: Christopher M. Paterson, Biloxi, MS (US); Bruce Kiern, Gulfport, MS (US)

(73) Assignee: Oreck Holdings, LLC, Cheyenne, WY (US)

(*) Notice: Subject to any disclaimer, the term of this patent is extended or adjusted under 35 U.S.C. 154(b) by 114 days.

(21) Appl. No.: 11/488,335

(22) Filed: Jul. 18, 2006

(65) Prior Publication Data
US 2008/0017027 A1    Jan. 24, 2008

(51) Int. Cl.
*B03C 3/68* (2006.01)
(52) U.S. Cl. .................... 95/2; 95/25; 96/18; 96/26; 96/30; 96/94
(58) Field of Classification Search ............ 96/15, 96/18, 26, 29, 30, 94; 95/2, 25, 57
See application file for complete search history.

(56) References Cited

U.S. PATENT DOCUMENTS

| | | | | |
|---|---|---|---|---|
| 2,129,783 A | * | 9/1938 | Penney | 96/79 |
| 3,188,784 A | * | 6/1965 | Nodolf | 96/22 |
| 3,504,482 A | * | 4/1970 | Goettl | 96/18 |
| 3,733,783 A | * | 5/1973 | Burney | 96/26 |
| 3,740,926 A | * | 6/1973 | Duval | 96/26 |
| 3,747,300 A | * | 7/1973 | Knudson | 96/58 |
| 3,766,844 A | * | 10/1973 | Donnelly et al. | 454/238 |
| 3,800,509 A | * | 4/1974 | Carr et al. | 96/18 |
| 3,907,525 A | * | 9/1975 | King | 96/53 |
| 4,341,537 A | | 7/1982 | Rodgers | 96/26 |
| 5,035,728 A | | 7/1991 | Fang | |
| 5,061,296 A | | 10/1991 | Sengpiel et al. | |
| 5,454,859 A | * | 10/1995 | Chiba et al. | 96/18 |
| 5,456,742 A | * | 10/1995 | Glenn et al. | 96/26 |
| 5,547,495 A | * | 8/1996 | Wright | 96/74 |
| 5,556,448 A | * | 9/1996 | Cheney et al. | 95/6 |
| 5,587,005 A | * | 12/1996 | De Marco | 96/26 |
| 5,628,818 A | * | 5/1997 | Smith et al. | 96/30 |

(Continued)

FOREIGN PATENT DOCUMENTS

| | | | | |
|---|---|---|---|---|
| JP | 6-91199 A | * | 4/1994 | 96/26 |

OTHER PUBLICATIONS

Service Information Manual for Friedrich C-90A Electronic Air Cleaner, 2003.

*Primary Examiner*—Richard L Chiesa
(74) *Attorney, Agent, or Firm*—The Ollila Law Group LLC

(57) ABSTRACT

An air cleaner is provided according to an embodiment of the invention. The air cleaner includes a power supply, an electrostatic precipitator cell, and a door. The door closes the electrostatic precipitator cell inside the air cleaner. The air cleaner further includes a door switch that is actuated by the door when the door is substantially closed. The air cleaner further includes a cell presence switch. The electrostatic precipitator cell actuates the cell presence switch when the electrostatic precipitator cell is at least partially inserted into the air cleaner. The cell presence switch and the door switch enable electrical power to be supplied from the power source to one or more air cleaner components when the electrostatic precipitator cell is at least partially inserted into the air cleaner and when the door is substantially closed.

32 Claims, 8 Drawing Sheets

U.S. PATENT DOCUMENTS

| | | | |
|---|---|---|---|
| 5,660,605 A * | 8/1997 | Chan et al. | 96/19 |
| 5,690,720 A * | 11/1997 | Spero | 96/26 |
| 5,704,955 A * | 1/1998 | Giles | 96/26 |
| 6,245,131 B1 * | 6/2001 | Rippelmeyer et al. | 96/18 |
| 6,576,046 B2 | 6/2003 | Pruette et al. | 96/26 |
| 6,749,667 B2 * | 6/2004 | Reeves et al. | 95/76 |
| 6,989,049 B2 * | 1/2006 | Belson et al. | 96/2 |
| 7,258,715 B2 * | 8/2007 | Cox et al. | 55/422 |
| 2003/0209420 A1 | 11/2003 | Taylor et al. | 204/164 |
| 2004/0123739 A1 * | 7/2004 | Jan | 96/18 |
| 2006/0260341 A1 * | 11/2006 | Meyvis | 62/331 |
| 2007/0039462 A1 * | 2/2007 | Helt et al. | 95/6 |

* cited by examiner

ELECTRICAL POWER DISABLE IN AN AIR CLEANER

TECHNICAL FIELD

The present invention relates to an air cleaner, and more particularly, to an electrical power disable for an air cleaner.

BACKGROUND OF THE INVENTION

Air cleaners and purifiers are widely used for removing foreign substances from the air. The foreign, substances can include pollen, dander, smoke, pollutants, dust, etc. In addition, an air cleaner can be used to circulate room air. An air cleaner can be used in many settings, including at home, in offices, workrooms, etc.

One type of air cleaner is an electrostatic precipitator. An electrostatic precipitator operates by creating a high-voltage electrical field, typically in excess of 5,000 volts. Dirt and debris in the air becomes ionized when it is brought into this high voltage electrical field by an airflow. Charged plates or electrodes in the electrostatic precipitator air cleaner, such as positive and negative plates or positive and grounded plates, create the electrical field and one of the electrode polarities attracts the ionized dirt and debris. Periodically, the electrostatic precipitator can be removed and cleaned. Because the electrostatic precipitator comprises electrodes or plates through which airflow can easily and quickly pass, only a low amount of energy is required to provide airflow through the electrostatic precipitator. As a result, foreign objects in the air can be efficiently and effectively removed.

The electrostatic precipitator is connected to a high voltage power supply that places a high voltage across the charge and collection plates of the electrostatic precipitator. The high voltage employed in a typical electrostatic precipitator presents a significant danger of arcing, shorting, and electrical shock. Arcing can occur when the electrostatic precipitator has been removed from the air cleaner but the high operating voltage supplied to the electrostatic precipitator is still present on the contacts or connectors of the electrostatic precipitator receptacle. Likewise, when an access door is open, a person can bring foreign objects (such as tools) into the air cleaner and can short across the components of the electrostatic precipitator (or across electrical supply points to the electrostatic precipitator). Further, a person can touch components of the electrostatic precipitator or can touch the electrical supply points and can suffer an electrical shock.

One prior art safety measure is shown in U.S. Patent Publication No. 2003/0209420 to Taylor et al. The Taylor publication provides an interlock post 204 that fits down into an interlock recess 206 in order to actuate a switch (see FIG. 3C of the Taylor publication). As a result, electrical power to the unit 200 is disabled when the interlock post 204 leaves the interlock recess 206. This safety measure is meant to insure that electrical power is removed from the unit 200 during any manner of cleaning or servicing operation.

However, this prior art approach has drawbacks. The switch of the Taylor publication is accessible to a person and can be circumvented. A suitable pointed object can be used to actuate the switch even when second electrodes 242 are present. A suitable pointed object can be used to actuate the switch when the second electrodes 242 are not fully inserted into position. Consequently, the device disclosed in the Taylor publication can be powered and can present a danger of contact and electrical shock.

The prior art does not provide more that one switch in order to prevent contact with electrified portions of the air cleaner. The prior art does not prevent the air cleaner from being powered up when the electrostatic precipitator cell is not in position or when the access door is not fully closed.

SUMMARY OF THE INVENTION

An air cleaner is provided according to an embodiment of the invention. The air cleaner comprises a power supply, an electrostatic precipitator cell, a door, and a post-filter. The door closes the electrostatic precipitator cell and the post-filter inside the air cleaner. The air cleaner further comprises a door switch that is actuated by the door when the door is substantially closed. The air cleaner further comprises a cell presence switch. The electrostatic precipitator cell actuates the cell presence switch when the electrostatic precipitator cell is at least partially inserted into the air cleaner. The cell presence switch and the door switch enable electrical power to be supplied from the power source to one or more air cleaner components when the electrostatic precipitator cell is at least partially inserted into the air cleaner and when the door is substantially closed.

An air cleaner is provided according to an embodiment of the invention. The air cleaner comprises a power supply, an electrostatic precipitator cell, and a door. The door closes the electrostatic precipitator cell inside the air cleaner. The air cleaner further comprises a door switch that is actuated by the door when the door is substantially closed. The air cleaner further comprises a cell presence switch. The electrostatic precipitator cell actuates the cell presence switch when the electrostatic precipitator cell is substantially fully inserted into the air cleaner. The cell presence switch and the door switch are connected in series between the power source and the electrostatic precipitator cell. The cell presence switch and the door switch enable electrical power to be supplied from the power source to the electrostatic precipitator cell when the electrostatic precipitator cell is substantially fully inserted into the air cleaner and when the door is substantially closed.

An air cleaner is provided according to an embodiment of the invention. The air cleaner comprises a power supply, an electrostatic precipitator cell, and a door. The door closes the electrostatic precipitator cell inside the air cleaner. The air cleaner further comprises a door switch that is actuated by the door when the door is substantially closed. The air cleaner further comprises a cell presence switch. The electrostatic precipitator cell actuates the cell presence switch when the electrostatic precipitator cell is substantially fully inserted into the air cleaner. The air cleaner further comprises a power switch connected to both the power source and the electrostatic precipitator cell. The air cleaner further comprises a processing system coupled to the door switch, the cell presence switch, and the power switch. The processing system receives and processes a door closed signal from the door switch and a cell presence signal from the cell presence switch and controls the power switch in order to enable electrical power to be supplied from the power source to one or more air cleaner components when the electrostatic precipitator cell is substantially fully inserted into the air cleaner and when the door is substantially closed.

An electrical power disable method for an air cleaner is provided according to an embodiment of the invention. The method comprises providing a door switch in the air cleaner, with the door switch being actuated by a door of the air cleaner when the door is substantially closed and with the door closing the electrostatic precipitator cell inside the air cleaner. The method further comprises providing a cell presence switch in the air cleaner. An electrostatic precipitator cell actuates the cell presence switch when the electrostatic precipitator cell is substantially fully inserted into the air cleaner. The method further comprises enabling electrical power to one or more air cleaner components when the electrostatic precipitator cell is detected by the cell presence switch to be substantially fully inserted into the air cleaner and when the door is detected to be substantially closed by the door switch.

BRIEF DESCRIPTION OF THE DRAWINGS

The same reference number represents the same element on all drawings. It should be noted that the drawings are not necessarily to scale.

DETAILED DESCRIPTION OF THE INVENTION

FIGS. 1-8 and the following descriptions depict specific embodiments to teach those skilled in the art how to make and use the best mode of the invention. For the purpose of teaching inventive principles, some conventional aspects have been simplified or omitted. Those skilled in the art will appreciate variations from these embodiments that fall within the scope of the invention. Those skilled in the art will also appreciate that the features described below can be combined in various ways to form multiple variations of the invention. As a result, the invention is not limited to the specific embodiments described below, but only by the claims and their equivalents.

Figure 1:
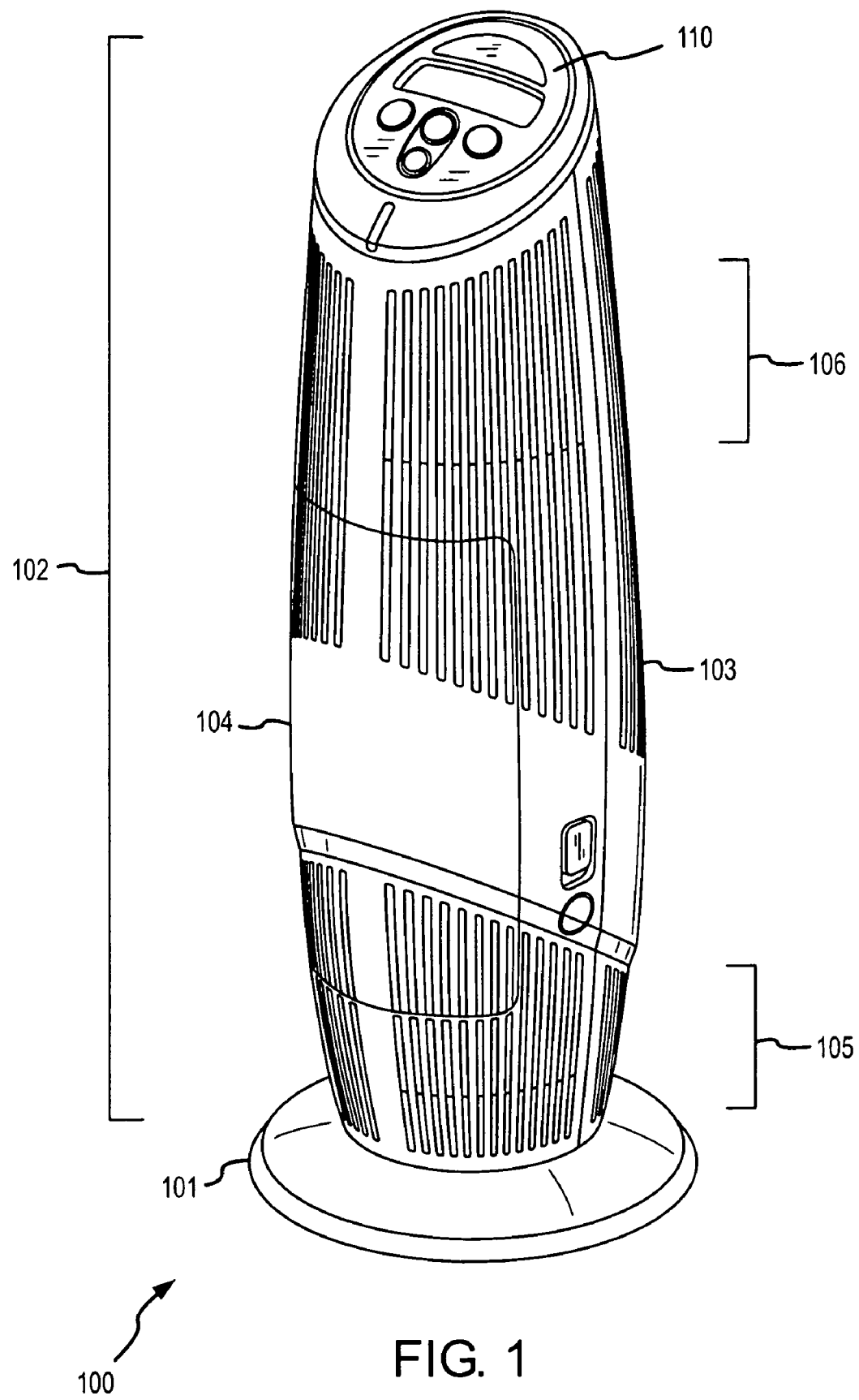
FIG. 1 shows a tower air cleaner according to an embodiment of the invention.

FIG. 1 shows a tower air cleaner 100 according to an embodiment of the invention. The tower air cleaner 100 includes a base portion 101 and a tower portion 102. The tower portion 102 can be generally vertically positioned and elongate in shape. In one embodiment, the tower portion 102 can be substantially cylindrical in shape. The tower portion 102 includes a shell 103, one or more doors 104, and a control panel 110. The tower portion 102 further includes an air inlet 105 and an air outlet 106. Air is drawn in through the air inlet 105, is cleaned inside the tower portion 102, and the cleaned air is exhausted from the air outlet 106. However, it should be understood that the air cleaner 100 can comprise other shapes, configurations, and designs, and the tower configuration is shown merely for illustration.

The air inlet 105 is shown as being at the lower end of the tower portion 102. However, it should be understood that alternatively the relative positions of the air inlet 105 and the air outlet 106 could be interchanged.

Figure 2:
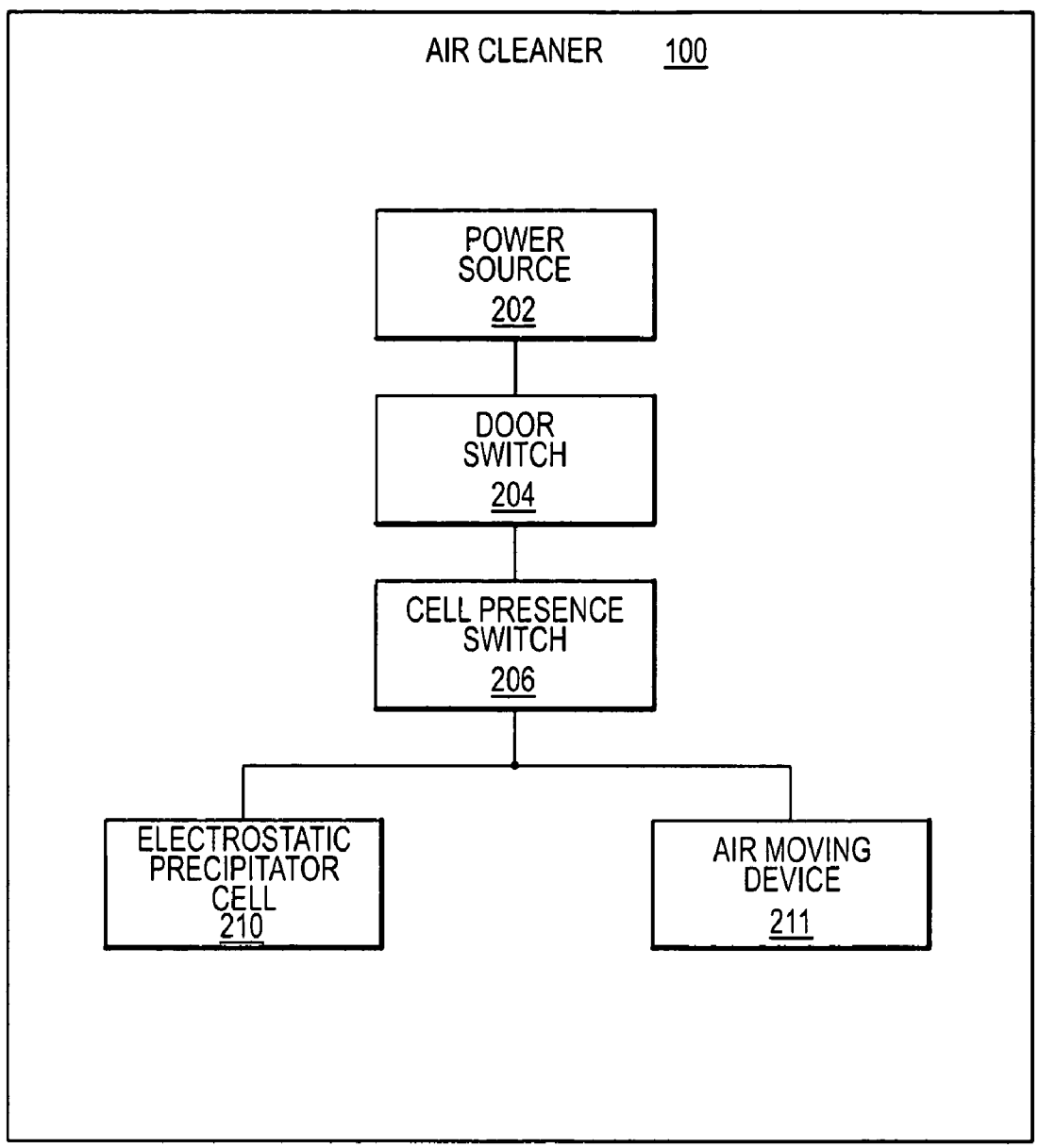
FIG. 2 shows the air cleaner according to an embodiment of the invention.

FIG. 2 shows the air cleaner 100 according to an embodiment of the invention. The air cleaner 100 can include a power source 202, a door switch 204, a cell presence switch 206, an electrostatic precipitator cell 210, and an air-moving device 211. In this embodiment, the door switch 204 and the cell presence switch 206 are connected in series between the power source 102 and the electrostatic precipitator cell 210. As a result, both the door switch 204 and the cell presence switch 206 must be closed in order for electrical power to pass from the power source 202 to the electrostatic precipitator cell 210. Therefore, as a safety design, electrical contacts provided in the air cleaner 100 for the electrostatic precipitator cell 210 will not be energized unless and until the electrostatic precipitator cell 210 is fully inserted into the air cleaner 100 and the door 104 is closed.

In addition, the door switch 204 and the cell presence switch 206 can be used to control electrical power to other components of the air cleaner 100. For example, the door switch 204 and the cell presence switch 206 can enable and disable electrical power to the air-moving device 211 and/or to the control panel 110. Alternatively, the door switch 204 and the cell presence switch 206 can enable and disable electrical power to substantially the entire air cleaner 100.

Furthermore, the cell presence switch 206 can also be used for other purposes. For example, the cell presence switch 206 can also indicate a presence or absence of the electrostatic precipitator cell 210 in order to reset a dirty timer. When the cell presence switch 206 indicates that the electrostatic precipitator cell 210 is fully in position in the air cleaner 100, the dirty timer will run and count an elapsed operational time. A dirty indication can be generated based on an elapsed operational time and based on a dirty time threshold. Therefore, whenever the electrostatic precipitator cell 210 is removed for cleaning, the associated timer will be automatically reset by the cell presence switch 206.

Figure 3:
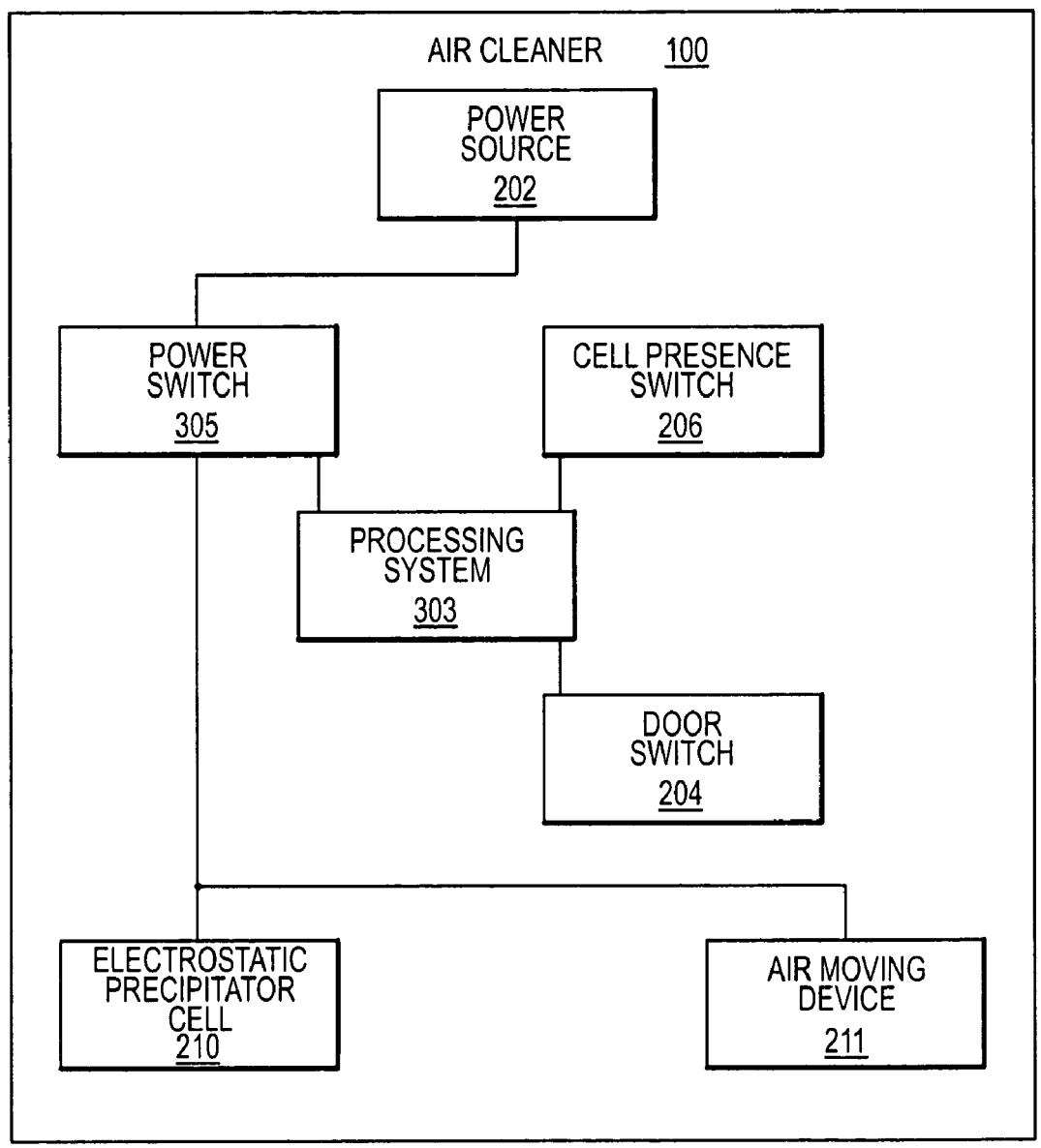
FIG. 3 shows the air cleaner according to another embodiment of the invention.

FIG. 3 shows the air cleaner 100 according to another embodiment of the invention. Elements in common with other figures share common reference numbers. In this embodiment, the air cleaner 100 additionally includes a processing system 303 and a power switch 305. The power switch 305 in this embodiment connects the electrostatic precipitator cell 210 to the power source 202, but under the control of the processing system 303. The processing system 303 therefore controls the power switch 305 to enable or disable electrical power to the electrostatic precipitator cell 210. The door switch 204 and the cell presence switch 206 provide signals to the processing system 303, such as switch open or closed signals. Consequently, the processing system 303 determines if the electrostatic precipitator cell 210 is fully inserted into the air cleaner 100 and determines if the door 104 is closed. Therefore, the processing system 303 receives signals from the door switch 204 and the cell presence switch 206 and controls the power switch 305 in order to control the supply of electrical power from the power source 202 to the electrostatic precipitator cell 210. In addition, the processing system 303 and the power switch 305 can enable or disable electrical power to other components of the air cleaner or to substantially enable or disable electrical power to the entire air cleaner 100, as previously discussed.

Figure 4:
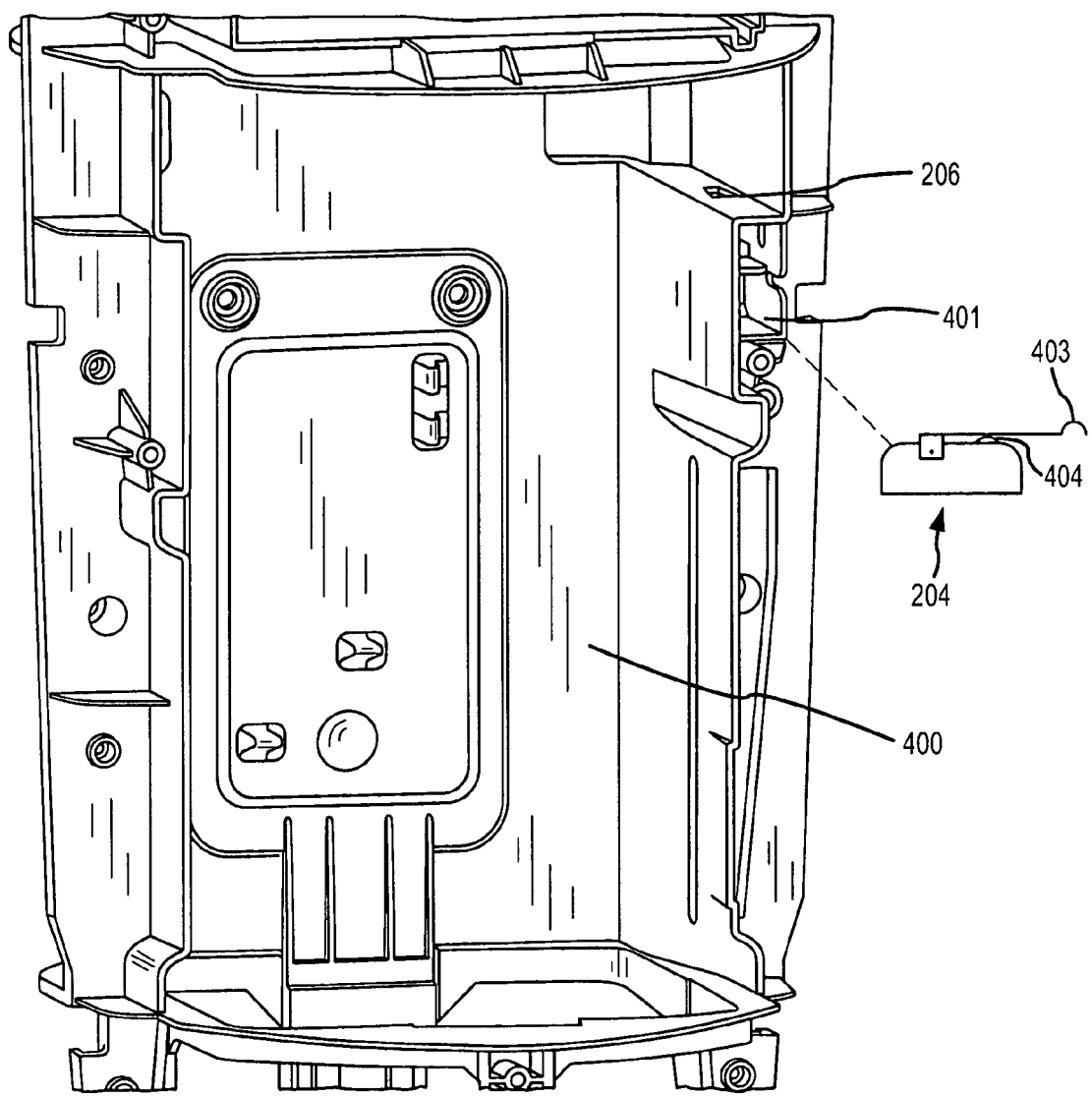
FIG. 4 shows an electrostatic precipitator receptacle and switches of the air cleaner according to an embodiment of the invention.

FIG. 4 shows an electrostatic precipitator receptacle 400 and switches of the air cleaner 100 according to an embodiment of the invention. The electrostatic precipitator receptacle 400 receives the electrostatic precipitator cell 210 (see FIG. 5). The electrostatic precipitator receptacle 400 in one embodiment includes a cell presence switch 206. The cell presence switch 206 in the embodiment shown is positioned on the side of the electrostatic precipitator receptacle 400. However, it should be understood that alternatively the cell presence switch 206 can be located anywhere in the electrostatic precipitator receptacle 400.

The cell presence switch 206 is contacted by the electrostatic precipitator cell 210 (or by a portion thereof) when the electrostatic precipitator cell 210 is at least partially inserted into the electrostatic precipitator receptacle 400. In some embodiments the cell presence switch 206 may require the electrostatic precipitator cell 210 to be fully inserted. The cell presence switch 206 can complete a circuit or alternatively can provide a cell presence signal to the processing system 303.

In one embodiment the cell presence signal can indicate a presence or absence of the electrostatic precipitator cell 210 in order to reset an electrostatic precipitator cell dirty timer. When the cell presence switch 206 indicates that the electrostatic precipitator cell 210 is in position in the air cleaner 100, the electrostatic precipitator cell dirty timer will run and count an elapsed operational time. A dirty indication can be generated based on an elapsed operational time and based on a dirty time threshold. Therefore, whenever the electrostatic precipitator cell 210 is removed for cleaning, the associated timer will be automatically reset by the cell presence switch 206.

The figure also shows a door switch receptacle 401 and a door switch 204, which includes an actuation member 403 and a plunger 404. The door switch 204 is shown out of the door switch receptacle 401 for purposes of clarity. The actuation member 403 is actuated by the opening and closing of the door 104. In one embodiment, a tab 802 on the door 104 depresses the actuation member 403 and closes the door switch 204 (see FIG. 8). The door switch 204 can complete a circuit or alternatively can provide a door-closed signal to the processing system 303.

Figure 5:
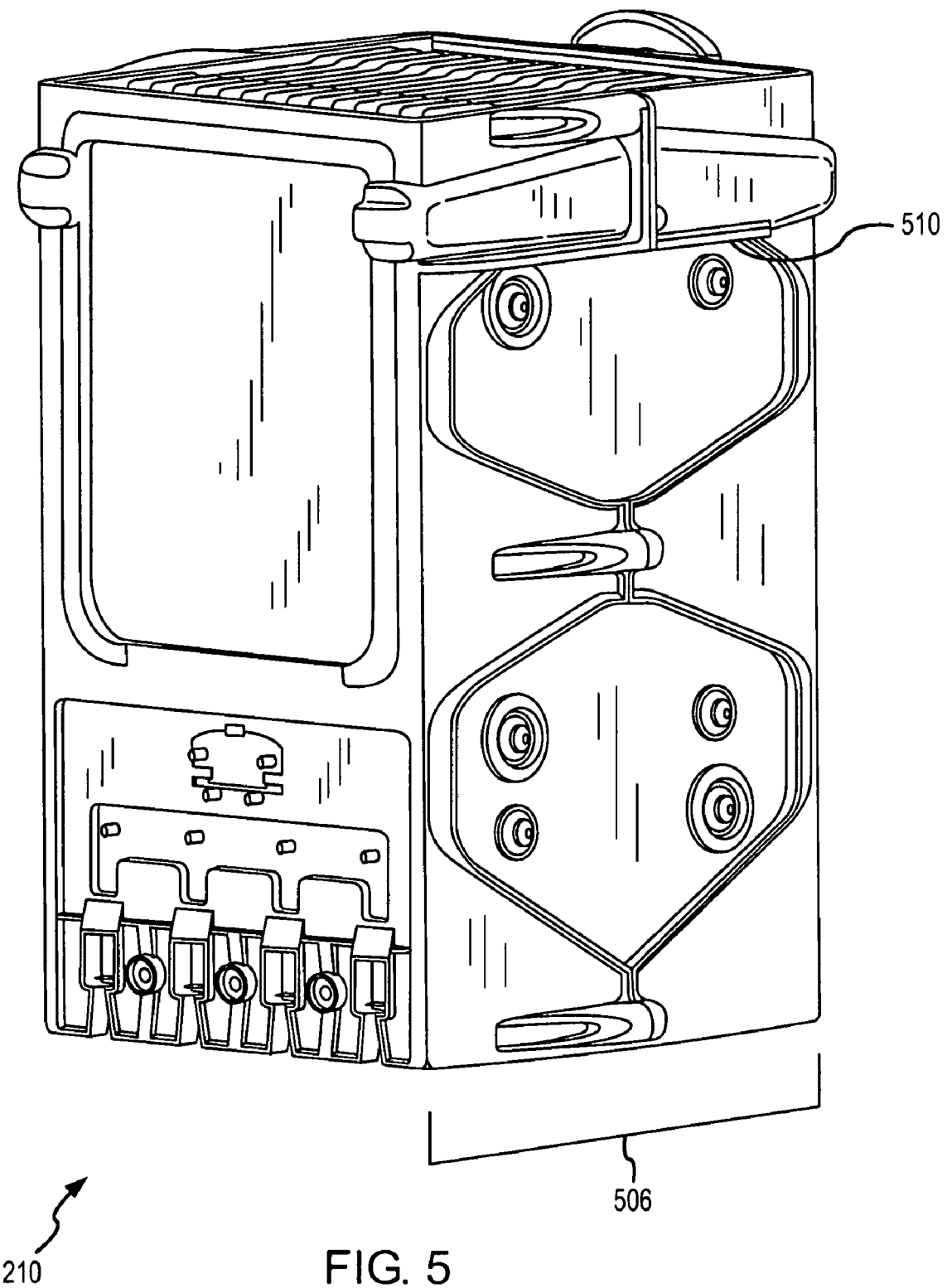
FIG. 5 shows an electrostatic precipitator cell according to an embodiment of the invention.

FIG. 5 shows the electrostatic precipitator cell 210 according to an embodiment of the invention. The electrostatic precipitator cell 210 in this embodiment includes one or more support projections 510 on one or more side surfaces 506 of the electrostatic precipitator cell 210. A projection 510 of the one or more projections 510 can contact the cell presence switch 206 when the electrostatic precipitator cell is at least partially inserted in the air cleaner 100, such as in the electrostatic precipitator receptacle 400.

Figure 6:
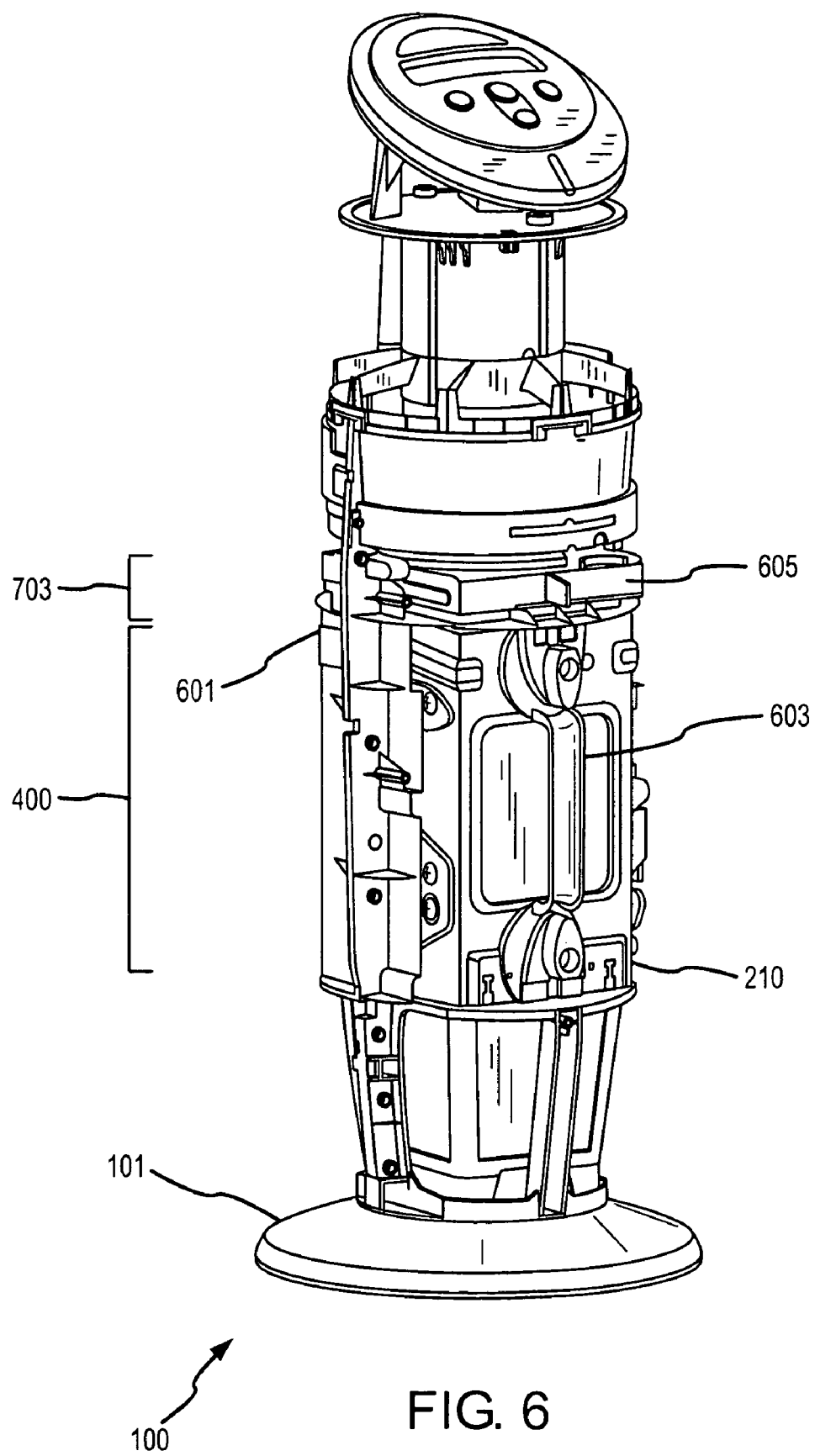
FIG. 6 shows the air cleaner without the shell or door.

FIG. 6 shows the air cleaner 100 without the shell 103 or door 104. The air cleaner 100 can include a chassis 601 that forms the electrostatic precipitator receptacle 400. In this figure, the electrostatic precipitator cell 210 is fully inserted into the electrostatic precipitator receptacle 400. The handle 603 can be used to insert and remove the electrostatic precipitator cell 210. In this figure, the cell presence switch 206 is contacted by the electrostatic precipitator cell 210 and the cell presence switch 206 therefore indicates that the electrostatic precipitator cell 210 is at least partially inserted into the air cleaner 100. FIG. 6 additionally shows the post-filter 605. The post-filter 605 in this figure is fully inserted into the post-filter receptacle 703. The post-filter presence switch 702 (see FIG. 7) is contacted by the post-filter 605 and the post-filter presence switch 702 therefore indicates that the post-filter 605 is at least partially inserted into the post-filter receptacle 703.

Figure 7:
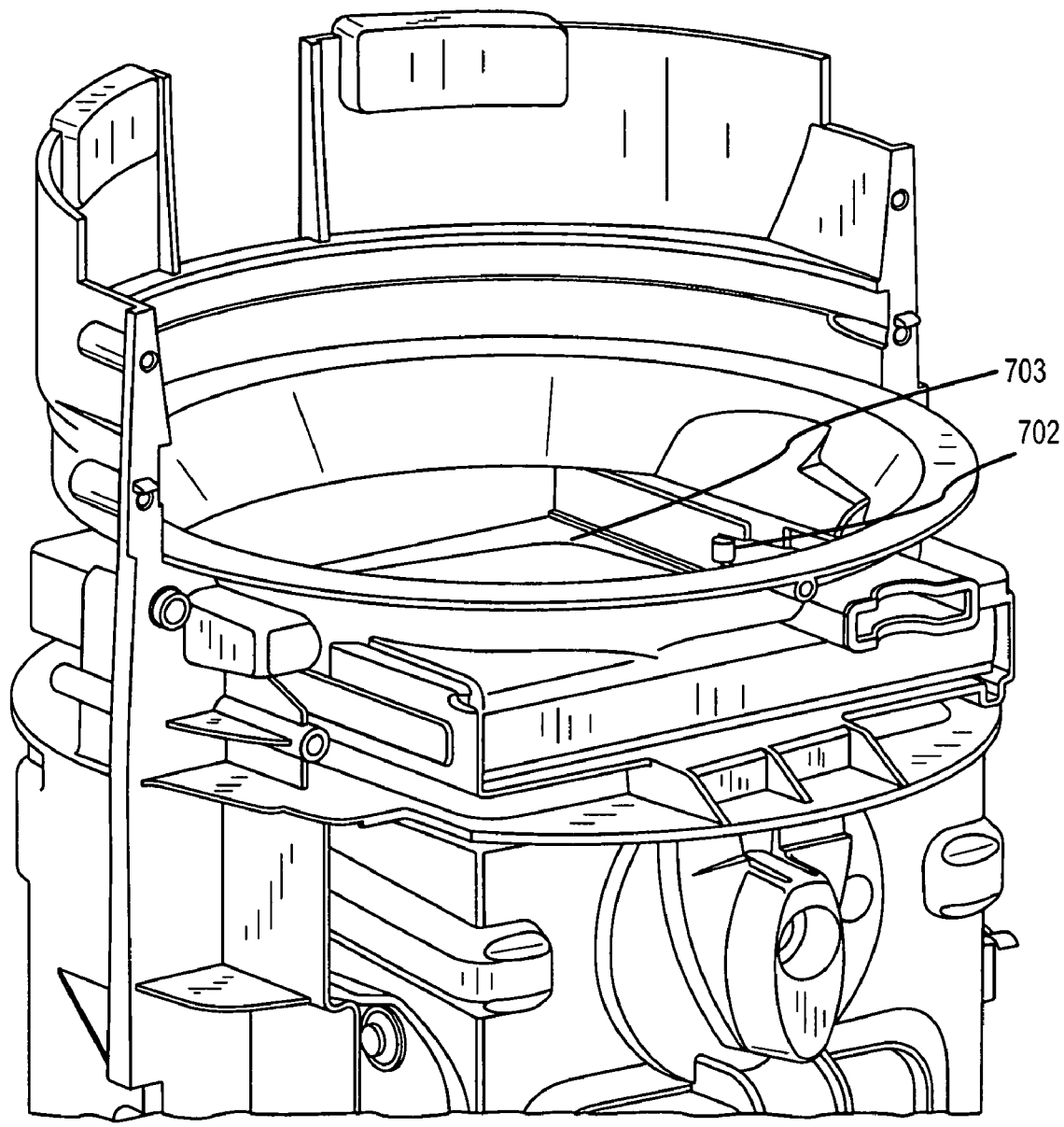
FIG. 7 shows a post-filter receptacle and a post-filter presence switch of the air cleaner according to an embodiment of the invention.

FIG. 7 shows a post-filter receptacle 703 and a post-filter presence switch 702 of the air cleaner 100 according to an embodiment of the invention. The post-filter presence switch 702 in the embodiment shown is located on the middle of the side-wall of the post-filter receptacle 703. However, it should be understood that alternatively the post-filter presence switch 702 can be located anywhere in the post-filter receptacle 703. As a result, the post-filter presence switch 702 is contacted by the post-filter 605 (or by a portion thereof) when the post-filter 605 is at least partially inserted into the post-filter receptacle 703. The post-filter 605 is shown inserted into the post-filter receptacle in FIG. 6. In some embodiments, the post-filter switch 702 may require the post-filter 605 to be fully inserted. The post-filter switch 702 can generate a signal to indicate if the post-filter is in place.

Additionally, the post-filter presence switch 702 can activate a post-filter dirty timer which can keep track of when the post-filter 605 needs to be replaced. When the post-filter presence switch 702 indicates that the post-filter 605 is fully in position in the air cleaner 100, the post-filter dirty timer will run and count an elapsed operational time (i.e., a time of fan operation). A dirty indication can be generated based on an elapsed operational time and based on a dirty time threshold. Therefore, whenever the post-filter 605 is removed for cleaning, the associated timer will be automatically reset by the post-filter presence switch 702.

Figure 8:
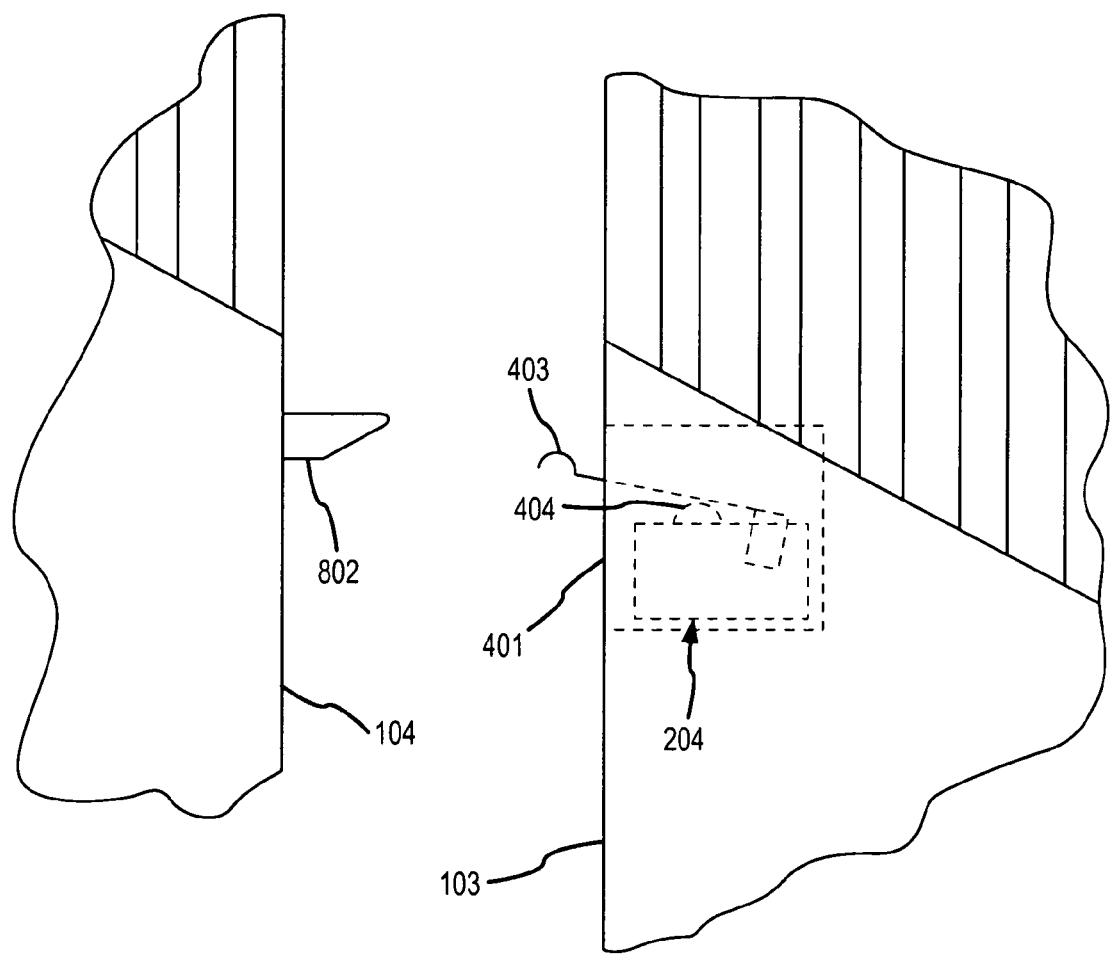
FIG. 8 shows a door tab and a door switch according to an embodiment of the invention.

FIG. 8 shows the door tab 802 and the door switch 204 according to an embodiment of the invention. In the embodiment shown, the door switch 204 is actuated when the door tab 802 slides over the actuation member 403, causing the actuation member 403 to press down on the plunger 404. The plunger 404 closes the door switch 204. However, it should be understood that the door switch could be actuated in other ways.

The electrical power disable according the invention can be implemented according to any of the embodiments in order to obtain several advantages, if desired. The invention provides an electrical power disable that disables electrical power when an access door is opened. The invention provides a door switch that detects whether a door of the air cleaner is open or closed. The invention provides an electrical power disable that disables electrical power when an electrostatic precipitator cell is not fully inserted into the air cleaner. The invention provides a cell presence switch that detects whether the electrostatic precipitator cell is or is not fully inserted into the air cleaner. The invention provides electrical power to the electrostatic precipitator cell if both the cell presence switch and the door switch are satisfied. The invention provides an electrical power disable wherein a switch that disables electrical power is not readily accessible. According to the invention, when the electrostatic precipitator cell is even partially inserted into the air cleaner, then the second switch (i.e., the cell presence switch) becomes inaccessible to human contact. The invention provides an electrical power disable that minimizes the danger of arcing, shorting, and electrical shock.

What is claimed is:

1. An air cleaner, comprising:
   a power supply;
   an electrostatic precipitator cell;
   a door, with the door closing the electrostatic precipitator cell inside the air cleaner;
   a door switch that is actuated by the door when the door is substantially closed; and
   a cell presence switch, wherein the electrostatic precipitator cell actuates the cell presence switch when the electrostatic precipitator cell is at least partially inserted into the air cleaner;
   wherein the cell presence switch and the door switch enable electrical power to be supplied from the power source to one or more air cleaner components when the electrostatic precipitator cell is at least partially inserted into the air cleaner and when the door is substantially closed.

2. The air cleaner of claim 1, with the air cleaner further comprising an electrostatic precipitator receptacle, wherein the cell presence switch is mounted inside the electrostatic precipitator receptacle.

3. The air cleaner of claim 1, with the air cleaner further comprising an electrostatic precipitator receptacle, wherein the cell presence switch is mounted inside a side surface of the electrostatic precipitator receptacle.

4. The air cleaner of claim 1, with the electrostatic precipitator cell further comprising at least one support projection extending from the electrostatic precipitator cell, wherein the at least one support projection presses against the cell presence switch when the electrostatic precipitator cell is at least partially inserted into the air cleaner.

5. The air cleaner of claim 1, with the door switch including an actuation member that is contacted by the door in order to actuate the door switch.

6. The air cleaner of claim 1, wherein the cell presence switch and the door switch further enable power to the electrostatic precipitator cell.

7. The air cleaner of claim 1, wherein the cell presence switch and the door switch further enable power to an air moving device.

8. The air cleaner of claim 1, with the cell presence switch and the door switch being connected in series between the power source and the electrostatic precipitator cell.

9. The air cleaner of claim 1, further comprising:
a power switch connected to both the power source and the electrostatic precipitator cell; and
a processing system coupled to the door switch, the cell presence switch, and the power switch, wherein the processing system receives and processes a door closed signal from the door switch and a cell presence signal from the cell presence switch and controls the power switch in order to enable electrical power to be supplied from the power source to the electrostatic precipitator cell when the electrostatic precipitator cell is at least partially inserted into the air cleaner and when the door is substantially closed.

10. An air cleaner, comprising:
a power supply;
an electrostatic precipitator cell;
a door, with the door closing the electrostatic precipitator cell inside the air cleaner;
a door switch that is actuated by the door when the door is substantially closed; and
a cell presence switch, wherein the electrostatic precipitator cell actuates the cell presence switch when the electrostatic precipitator cell is at least partially inserted into the air cleaner;
wherein the cell presence switch and the door switch are connected in series between the power source and the electrostatic precipitator cell and wherein the cell presence switch and the door switch enable electrical power to be supplied from the power source to the electrostatic precipitator cell when the electrostatic precipitator cell is at least partially inserted into the air cleaner and when the door is substantially closed.

11. The air cleaner of claim 10, with the air cleaner further comprising an electrostatic precipitator receptacle, wherein the cell presence switch is mounted inside the electrostatic precipitator receptacle.

12. The air cleaner of claim 10, with the air cleaner further comprising an electrostatic precipitator receptacle, wherein the cell presence switch is mounted inside a side surface of the electrostatic precipitator receptacle.

13. The air cleaner of claim 10, with the electrostatic precipitator cell further comprising at least one support projection extending from the electrostatic precipitator cell, wherein the at least one support projection presses against the cell presence switch when the electrostatic precipitator cell is at least partially inserted into the air cleaner.

14. The air cleaner of claim 10, with the door switch including an actuation member that is contacted by the door in order to actuate the door switch.

15. The air cleaner of claim 10, wherein the cell presence switch and the door switch further enable power to one or more air cleaner components.

16. The air cleaner of claim 10, wherein the cell presence switch and the door switch further enable power to an air moving device.

17. An air cleaner, comprising:
a power supply;
an electrostatic precipitator cell;
a door, with the door closing the electrostatic precipitator cell inside the air cleaner;
a door switch that is actuated by the door when the door is substantially closed;
a cell presence switch, wherein the electrostatic precipitator cell actuates the cell presence switch when the electrostatic precipitator cell is at least partially inserted into the air cleaner;
a power switch connected to both the power source and the electrostatic precipitator cell; and
a processing system coupled to the door switch, the cell presence switch, and the power switch, wherein the processing system receives and processes a door closed signal from the door switch and a cell presence signal from the cell presence switch and controls the power switch in order to enable electrical power to be supplied from the power source to one or more air cleaner components when the electrostatic precipitator cell is at least partially inserted into the air cleaner and when the door is substantially closed.

18. The air cleaner of claim 17, with the air cleaner further comprising an electrostatic precipitator receptacle, wherein the cell presence switch is mounted inside the electrostatic precipitator receptacle.

19. The air cleaner of claim 17, with the air cleaner further comprising an electrostatic precipitator receptacle, wherein the cell presence switch is mounted inside a side surface of the electrostatic precipitator receptacle.

20. The air cleaner of claim 17, with the electrostatic precipitator cell further comprising an actuator tab extending from the electrostatic precipitator cell, wherein the actuator tab presses against the cell presence switch when the electrostatic precipitator cell is at least partially inserted into the air cleaner.

21. The air cleaner of claim 17, with the door switch including an actuation member that is contacted by the door in order to actuate the door switch.

22. The air cleaner of claim 17, wherein the cell presence switch and the door switch further enable power to the electrostatic precipitator cell.

23. The air cleaner of claim 17, wherein the cell presence switch and the door switch Thither enable power to an air moving device.

24. An electrical power disable method for an air cleaner, the method comprising:
a power supply;
providing a door switch in the air cleaner, with the door switch being actuated by a door of the air cleaner when the door is substantially closed and with the door closing an electrostatic precipitator cell inside the air cleaner;
providing a cell presence switch in the air cleaner, wherein the electrostatic precipitator cell actuates the cell presence switch when the electrostatic precipitator cell is at least partially inserted into the air cleaner; and enabling electrical power to one or more air cleaner components when the electrostatic precipitator cell is detected by the cell presence switch to be at least partially inserted into the air cleaner and when the door is detected to be substantially closed by the door switch.

25. The method of claim 24, with the air cleaner further comprising an electrostatic precipitator receptacle, wherein the cell presence switch is mounted inside the electrostatic precipitator receptacle.

26. The method of claim 24, with the air cleaner further comprising an electrostatic precipitator receptacle, wherein the cell presence switch is mounted inside a side surface of the electrostatic precipitator receptacle.

27. The method of claim 24, with the electrostatic precipitator cell further comprising at least one support projection extending from the electrostatic precipitator cell, wherein the at least one support projection presses against the cell presence switch when the electrostatic precipitator cell is at least partially inserted into the air cleaner.

28. The method of claim 24, with the door switch including an actuation member that is contacted by the door in order to actuate the door switch.

29. The method of claim 24, wherein the cell presence switch and the door switch further enable power to the electrostatic precipitator cell.

30. The method of claim 24, wherein the cell presence switch and the door switch further enable power to an air-moving device.

31. The method of claim 24, with the cell presence switch and the door switch being connected in series between the power source and the electrostatic precipitator cell.

32. The method of claim 24, further comprising:
   a power switch connected to both the power source and the electrostatic precipitator cell; and
   a processing system coupled to the door switch, the cell presence switch, and the power switch, wherein the processing system receives and processes a door closed signal from the door switch and a cell presence signal from the cell presence switch and controls the power switch in order to enable electrical power to be supplied from the power source to the electrostatic precipitator cell when the electrostatic precipitator cell is at least partially inserted into the air cleaner and when the door is substantially closed.

* * * * *

UNITED STATES PATENT AND TRADEMARK OFFICE
CERTIFICATE OF CORRECTION

PATENT NO. : 7,413,594 B2 Page 1 of 1
APPLICATION NO. : 11/488335
DATED : August 19, 2008
INVENTOR(S) : Paterson et al.

It is certified that error appears in the above-identified patent and that said Letters Patent is hereby corrected as shown below:

Column 8:
Line 55 (claim 23, line 2), change "Thither" to -- further --.

Signed and Sealed this

Sixth Day of January, 2009

JON W. DUDAS
*Director of the United States Patent and Trademark Office*